(12) United States Patent
Lin et al.

(10) Patent No.: US 9,489,467 B2
(45) Date of Patent: Nov. 8, 2016

(54) APPARATUS AND METHOD FOR SIMPLIFYING SERVICE INTERFACE TO ACCESS WEB SERVICE

(75) Inventors: Tzu-Ming Lin, Hsinchu (TW); Chien-Ming Chou, Taichung (TW); Ya Ping Jeng, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 1303 days.

(21) Appl. No.: 11/760,059

(22) Filed: Jun. 8, 2007

(65) Prior Publication Data
US 2008/0172394 A1     Jul. 17, 2008

(30) Foreign Application Priority Data
Jan. 11, 2007   (TW) .............................. 96101043 A

(51) Int. Cl.
| G06F 17/30 | (2006.01) |
|---|---|
| G06F 3/048 | (2013.01) |
| H04L 29/08 | (2006.01) |

(52) U.S. Cl.
CPC ..... *G06F 17/3089* (2013.01); *G06F 17/30899* (2013.01); *G06F 17/30905* (2013.01); *H04L 67/02* (2013.01)

(58) Field of Classification Search
CPC ..................... G06F 17/3089; G06F 17/30899; H04L 67/02
USPC .............................................. 709/206; 707/10
See application file for complete search history.

(56) References Cited

U.S. PATENT DOCUMENTS

| 5,898,838 | A | 4/1999 | Wagner ........................... 395/200 |
|---|---|---|---|
| 6,366,967 | B1 | 4/2002 | Wagner ........................... 710/33 |
| 6,684,269 | B2 | 1/2004 | Wagner ........................... 710/33 |
| 6,694,387 | B2 | 2/2004 | Wagner ........................... 710/33 |
| 6,745,259 | B2 | 6/2004 | Wagner ........................... 710/33 |
| 7,574,486 | B1* | 8/2009 | Cheng et al. .................. 709/219 |
| 2001/0047415 | A1* | 11/2001 | Skene et al. ................... 709/226 |
| 2001/0047428 | A1* | 11/2001 | Hunter ................ G06F 17/3089 709/245 |
| 2002/0174010 | A1* | 11/2002 | Rice, III ........... G06F 17/30194 705/14.67 |
| 2002/0174177 | A1* | 11/2002 | Miesen ............... H04M 3/4281 709/203 |
| 2003/0055870 | A1* | 3/2003 | Smethers ....................... 709/203 |
| 2003/0105806 | A1* | 6/2003 | Gayle et al. ................... 709/203 |
| 2004/0199614 | A1* | 10/2004 | Shenfield et al. ............ 709/220 |
| 2004/0205650 | A1* | 10/2004 | Cheng .......................... 715/530 |
| 2004/0249801 | A1* | 12/2004 | Kapur ............... G06F 17/30864 |
| 2005/0037779 | A1* | 2/2005 | Ma et al. .................... 455/456.6 |

(Continued)

FOREIGN PATENT DOCUMENTS

TW          583556          4/2004

*Primary Examiner* — Linglan Edwards
(74) *Attorney, Agent, or Firm* — Finnegan, Henderson, Farabow, Garrett & Dunner LLP

(57) ABSTRACT

A device for accessing web services uses a service interface and a conversion and interpretation unit to implement a method which simplifies the access interface of wave services. The service interface includes an upload element, a download element and a command element. With the conversion and interpretation unit, the data and the command of web pages are converted and interpreted as the contents of the three elements. The contents are converted into web page documents and forwarded to a network platform for further processing associated tasks. The presentation on the service interface may replace the browsers and achieve the function of supporting the participation-typed service. It simplifies the complexity on the network access interface, and can access different services provided by different servers.

17 Claims, 9 Drawing Sheets

(56) References Cited

U.S. PATENT DOCUMENTS

| | | | |
|---|---|---|---|
| 2005/0223084 A1* | 10/2005 | Cheng | G06F 17/30905 709/219 |
| 2006/0085743 A1* | 4/2006 | Baudisch et al. | 715/526 |
| 2006/0160529 A1* | 7/2006 | Glass | G06F 8/61 455/418 |
| 2006/0242248 A1* | 10/2006 | Kokkinen | H04M 1/72522 709/206 |
| 2007/0088786 A1* | 4/2007 | Hardy et al. | 709/206 |
| 2007/0220008 A1* | 9/2007 | Mizhar | H04L 67/06 |

* cited by examiner

```xml
<?xml version="1.0"?>
<compactdiscs>
    <compactdisc>
        <artist type="individual">Frank Sinatra</artist>
        <title numberoftracks="4">In The Wee Small Hours</title>
        <tracks>
            <track>In The Wee Small Hours</track>
            <track>Mood Indigo</track>
            <track>Glad To Be Unhappy</track>
            <track>I Get Along Without You Very Well</track>
        </tracks>
        <price>$12.99</price>
    </compactdisc>
    <compactdisc>
        <artist type="band">The Offspring</artist>
        <title numberoftracks="5">Americana</title>
        <tracks>
            <track>Welcome</track>
            <track>Have You Ever</track>
            <track>Staring At The Sun</track>
            <track>Pretty Fly (For A White Guy)</track>
        </tracks>
        <price>$12.99</price>
    </compactdisc>
</compactdiscs>
```

FIG. 7

APPARATUS AND METHOD FOR SIMPLIFYING SERVICE INTERFACE TO ACCESS WEB SERVICE

FIELD OF THE INVENTION

The present invention generally relates to an apparatus and method for simplifying the service interface to access web service, applicable to the network with communication capability.

BACKGROUND OF THE INVENTION

The modern communication devices, such as hand-held devices, are thin, small, and consume little power. However, there still exist limitations on the use of these devices. For example, when accessing web service, these hand-held devices can only show a small part of the web page contents on the small screen. This leads to the inconvenient browsing. Furthermore, sometimes multiple key combinations are used to access web service, which is not as convenient as using a keyboard or mouse.

One possible solution is to develop simplified web pages for the hand-held device access. However, as the new web service and web pages are continuously developed, it is neither practical nor economical to develop simplified versions of all the web pages. On the other hand, although a larger screen may solve the above problem, a large screen consumes much more power and shortens the battery time.

FIG. 1 shows a web-as-participation-platform service, such as Web 2.0. As shown in FIG. 1, a network platform 100 can be shared, or constructed by participants. Every user can be connected to network platform 100 to retrieve or share all types of information, including audiovisual, text, images, and so on. The participation-typed service has been widely adopted on desktop computers 110 or portable PC 120. The manner of using participation-typed service is through the interface provided by browser 130 to upload or download the contents on network platform 100. This type of architecture of participation promotes the personalized service through experience and the communication among users through the use of tag and sharing.

To provide this type of network service, such as browser, on the hand-held device, the problem encountered is the complexity of the interface as well as the computing complexity of the services on such thin and small hand-held devices.

U.S. Pat. No. 6,745,259 disclosed an open network and corresponding communication protocol to provide the device without standard I/O, such as card reader, voice phone, to communicate PC with standard I/O for database or information exchange in a banking system. This open network system solved the transmission problem between the central server and a plurality of peripheral transaction devices in a bank system. By using a common communication protocol to transmit the transaction data of different non-standard peripheral devices, the disclosed patent then uses a central server to analyze the contents of the transaction.

As shown in FIG. 2, in a network system 200, central server 210 uses the tag of the http communication protocol to provide the data transmission guideline to the non-standard devices in open network 230. According to the available I/O on the devices, the central server uses common gateway interface (CGI) 220 to convert and communicate so that processing system 240 can exchange data with PC while avoid the risk of information theft caused by incomplete network safety mechanism under the network communication protocol. The analysis capability of central server 210 provides secured transmission service to the peripheral devices to solve the transmission security problem.

SUMMARY OF THE INVENTION

The examples consistent with the invention may provide an apparatus and method for simplifying service interface to access network service to support the participation-typed service. The simplified interface allows the user to access different services provided by different servers in the network.

In one exemplary embodiment, the present disclosure is directed to an apparatus for simplifying service interface to access network service, the apparatus comprising: a service interface that includes at least one of an upload element, a download element and a command element, for providing a user to access information contents; and a conversion and interpretation unit, wherein the conversion and interpretation unit interprets a request for the information contents as data for the upload element, the download element and the command element; transmits the data for displaying on the service interface; compiles the data into a web page document to be transmitted to the network platform for processing; compiles returned data from the network platform, and transmits the compiled returned data for displaying on the service interface.

In another exemplary embodiment, the present disclosure is directed to a method for simplifying service interface to access network service, applicable to a network platform, the method comprising: providing a service interface for a user to access information contents, the service interface having an upload element, a download element and a command element; compiling the first data into a web page document and transmitting the web page document to the network platform for processing, and returning second data; and compiling the second data into third data, and transmitting the third data to the service interface.

The foregoing and other features of the invention will become better understood from a careful reading of a detailed description provided herein below with appropriate reference to the accompanying drawings.

BRIEF DESCRIPTION OF THE DRAWINGS

FIG. 7 shows an exemplary XML web page document, consistent with the invention.

DETAILED DESCRIPTION OF THE PREFERRED EMBODIMENTS

Figure 3A:
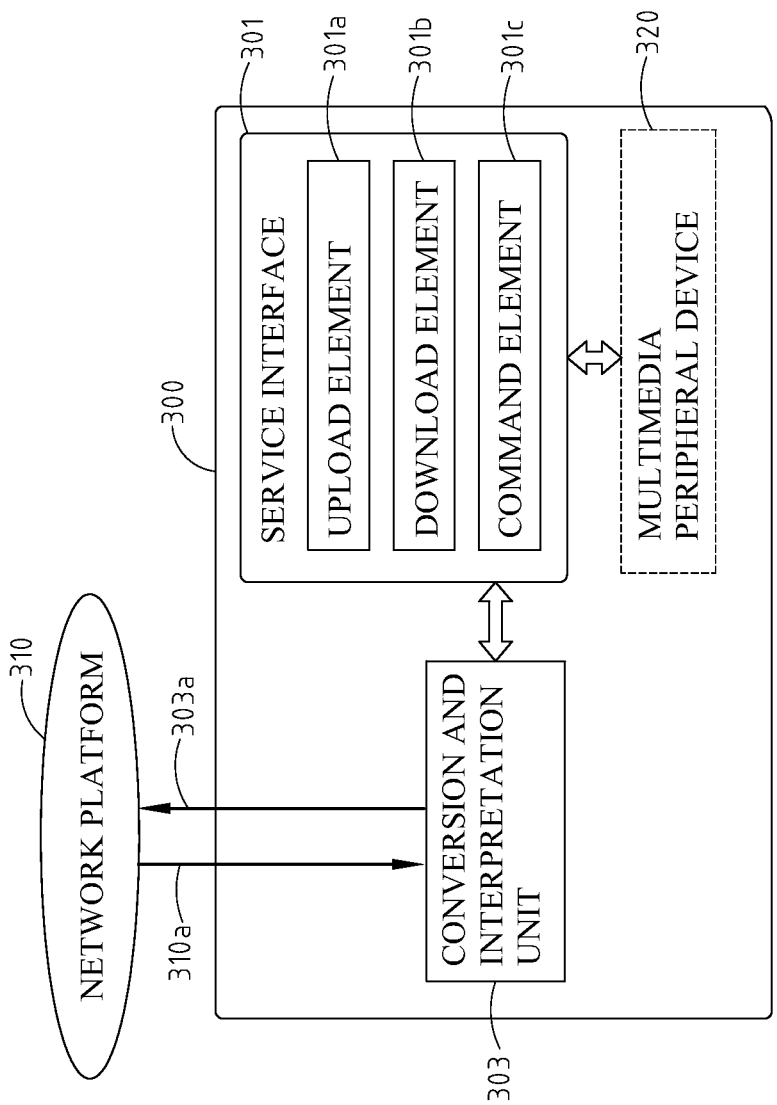
FIG. 3A shows a schematic view, illustrating an exemplary device with a simplified service interface for accessing network service applicable to a network platform, consistent with the invention.

The exemplary examples consistent with the invention use the characteristics of participation-typed service to categorize the information contents and compile the information contents for display on communication devices through a simplified service interface. FIG. 3A shows an exemplary example of a schematic view of a device with a simplified service interface, consistent with the invention for accessing network service applied on a network platform.

As shown in FIG. 3A, a device 300 with the simplified service interface for accessing network service includes a service interface 301, and a conversion and interpretation unit 303. The service interface 301 includes an upload element 301a, a download element 301b, and a command element 301c for the user to access information contents. The conversion and interpretation unit 303 interprets, through the service interface 301, a request for the information contents as the data for upload element 301a, download element 301b and command element 301c, and display the data on service interface 301. Then, the conversion and interpretation unit 303 compiles a web page 303a, transmits web page 303a to network platform 310 for corresponding processing, converts returned data 310a from network platform 310, and compiles returned data 310a to the service interface 301 for display.

The information contents displayed on service interface 301 can be optionally connected to one or more multimedia peripheral devices 320 for displaying, capturing or extracting information contents.

Figure 3B:
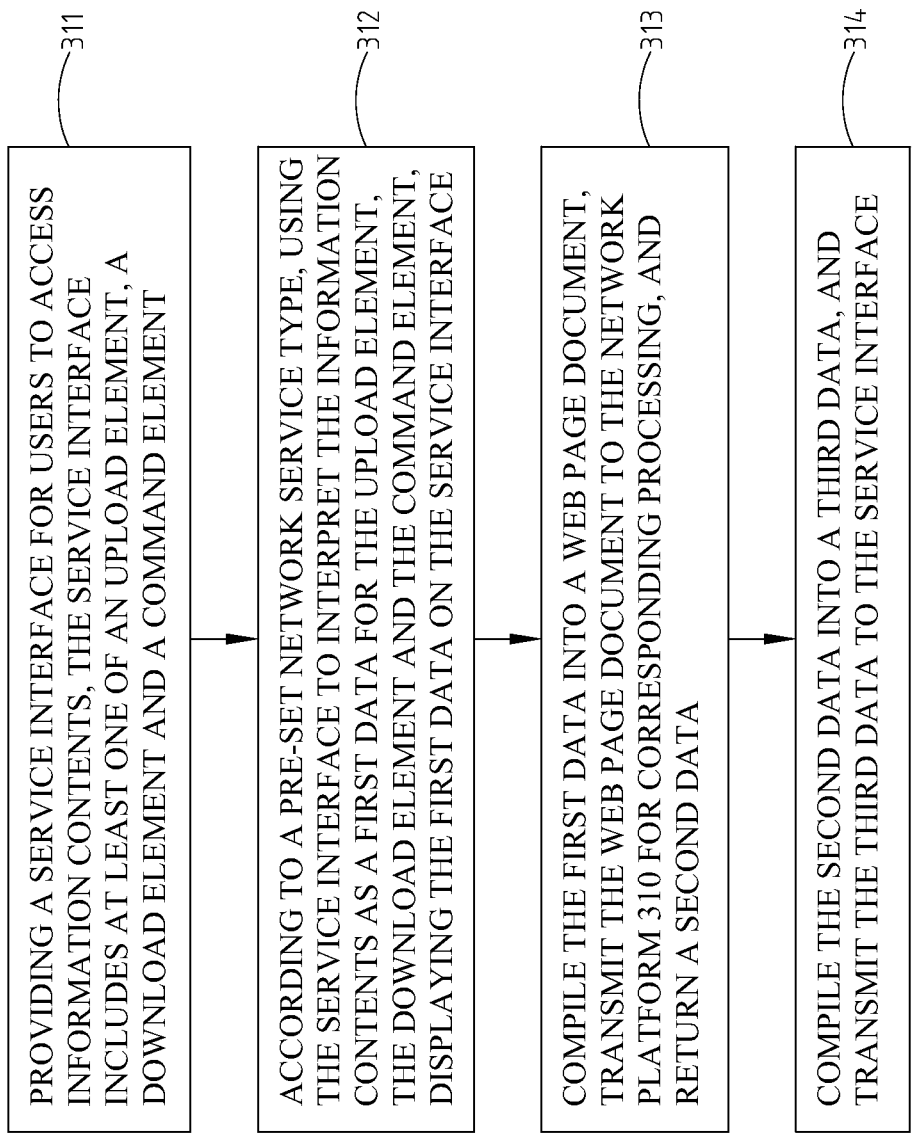
FIG. 3B shows a flowchart, illustrating an exemplary operation of a device with a simplified service interface for accessing network service applicable to a network platform, consistent with the invention.

FIG. 3B shows a flowchart illustrating the operation process of an exemplary example consistent with the invention applied to a network platform. As shown in FIG. 3B, step 311 is to provide the service interface 301 for users to access information contents. The service interface 301 includes an upload element 301a, a download element 301b and a command element 301c. Step 312 is to use the service interface 301 according to a defined network service type to interpret a request for the information contents as a first data for the upload element 301a, the download element 301b and the command element 301c, and displays the first data on the service interface 301. Step 313 is to compile the first data into a web page document, transmits the web page document to the network platform 310 for corresponding processing, and returns a second data. Step 314 is to compile the second data into a third data, and transmit the third data to the service interface 301.

Figure 1:
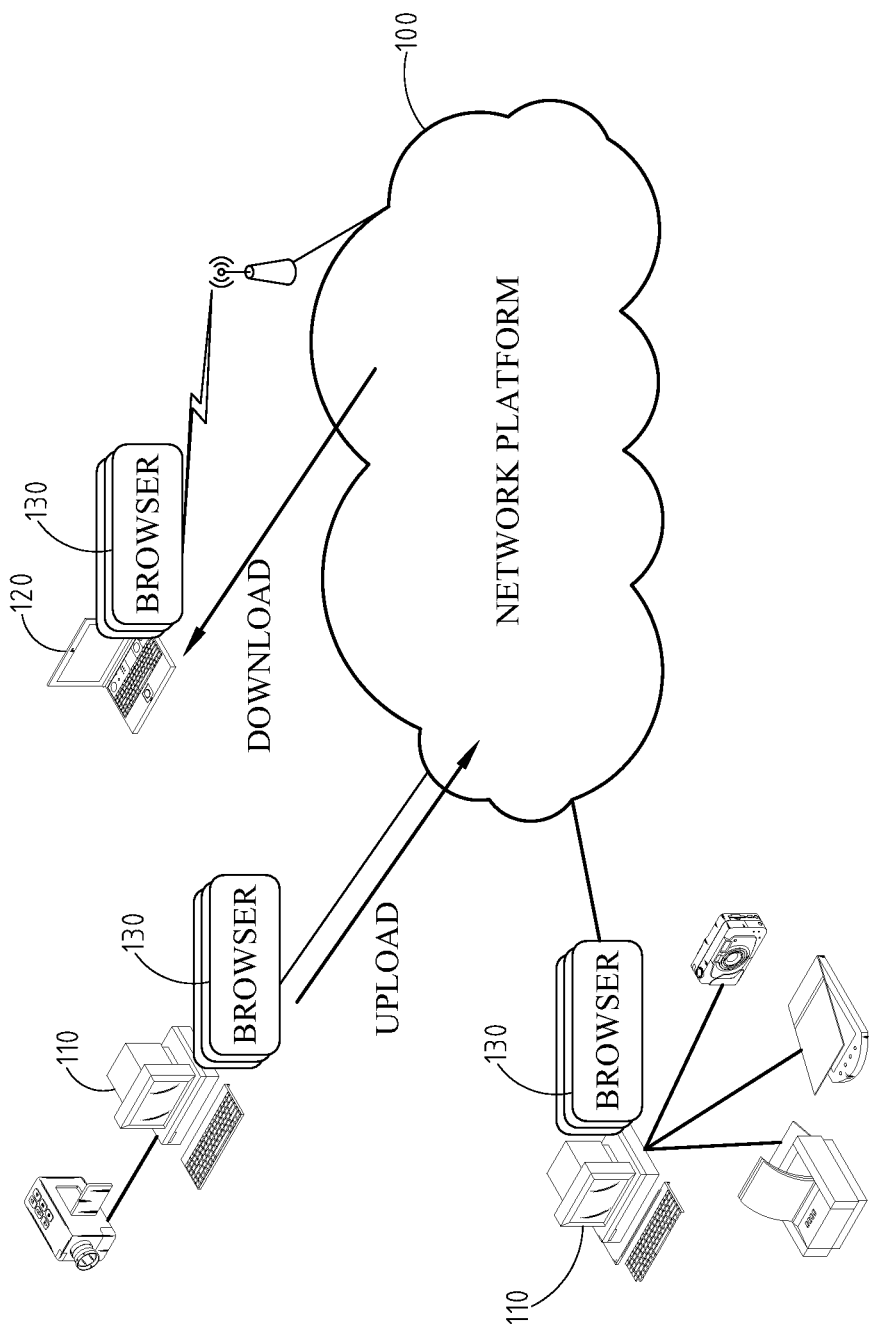
FIG. 1 shows a schematic view of a conventional participation-typed network service.
Figure 2:
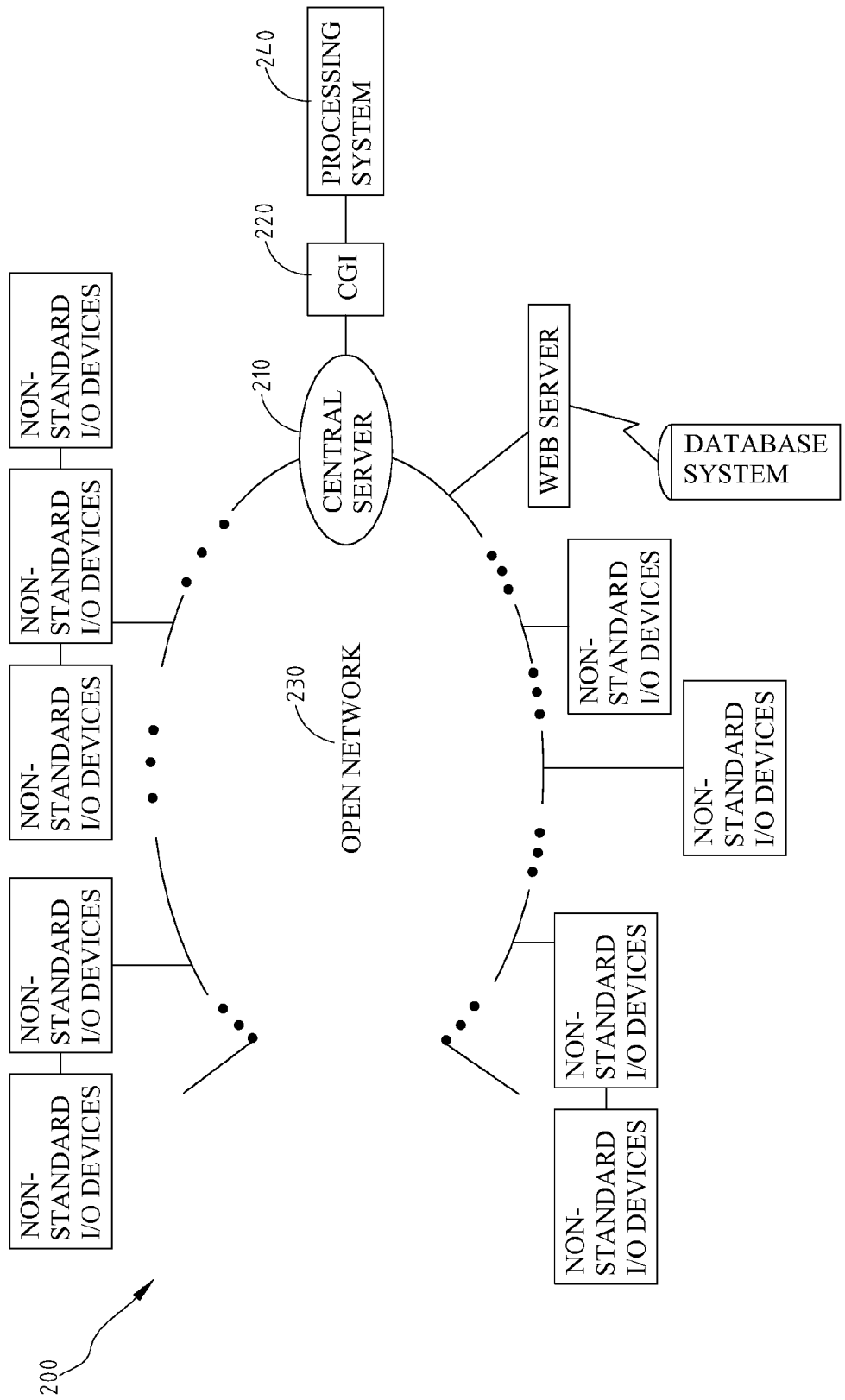
FIG. 2 shows a schematic view of a conventional open network system.
Figure 4:
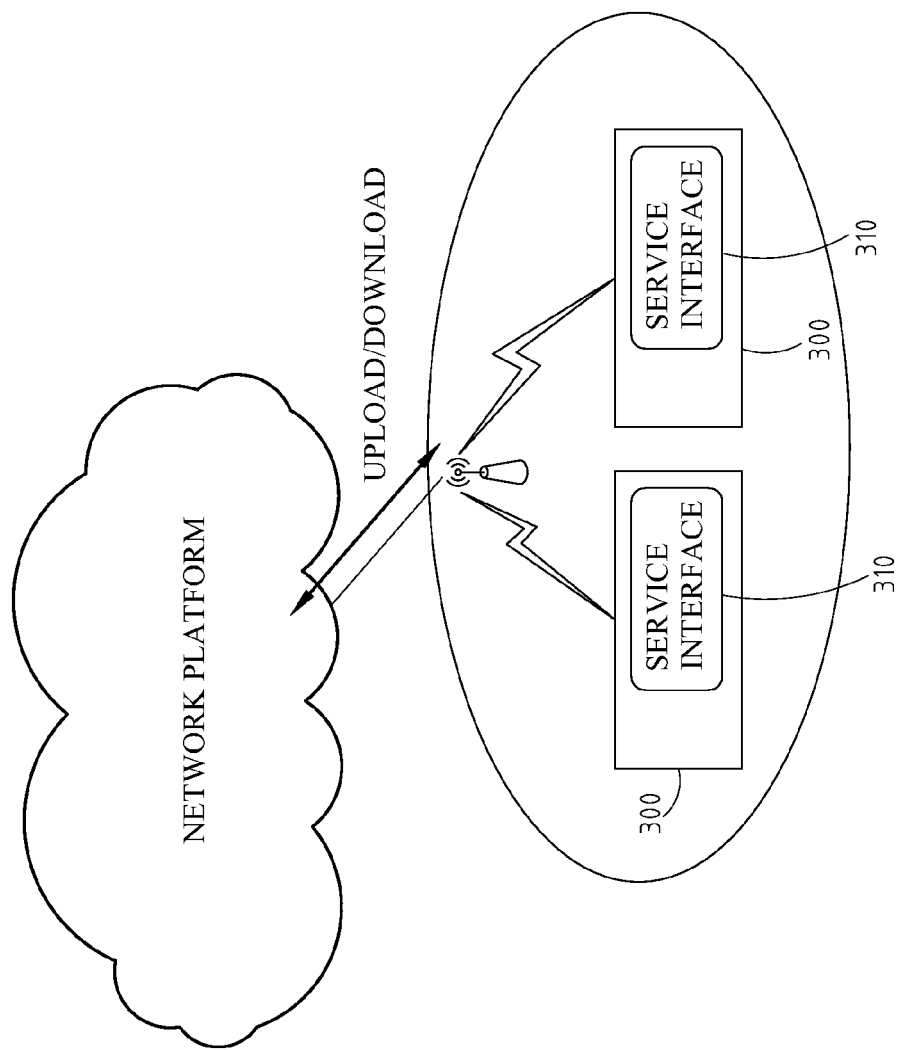
FIG. 4 shows a schematic view, illustrating an exemplary service interface applied to a network platform to accomplish participation-typed service, consistent with the invention.

The service interface of the present invention can replace browser 130 of FIG. 1 to support the participation-typed service. The service interface also provides the user with a simplified service interface for accessing different services provided by different servers on the network. FIG. 4 shows a schematic view of the application of the service interface 301 of an exemplary example consistent with the invention to participate in the network platform 310 to accomplish the participation-typed service.

In cooperation with the existing multimedia peripheral devices, such as a microphone or a digital camera, of the communication devices, the service interface can access information contents, such as texts, images, multimedia or any combination of these three types, and generates different commands according to the service content. The data for upload element can be text, image, multimedia, or any combination of these three types. Similarly, the data for download element type can be text, image, multimedia, or any combination of these three types. The multimedia, for example, may include at least one of audio and video.

The data for command element are a plurality of different commands generated according to the service content. Through the service interface, the users can input the information for uploading and being transmitted with the commands to the conversion and interpretation unit. The conversion and interpretation unit converts, according to the type and the characteristics of the network service, into commands and information for the conventional browser, and protocols, such as HTTP, for transmission to one or more terminals or servers through the network interface.

To download information contents from the network platform, the commands and contents for downloading can also be converted by the conversion and interpretation unit into a web page transmitted by a conventional browser to the server, terminal or host on the network to request downloading. In addition to uploading and downloading, the upload element and the download element work with the command element to present the functions provided by a conventional browser, such as uploading a keyword for searching, and displaying the search result on the download element of the service interface. Another example is for the command element to issue the share command to instruct the conversion and interpretation unit to convert the information contents displayed on the download element to be uploaded to the network platform for sharing with other users.

Figure 5A:
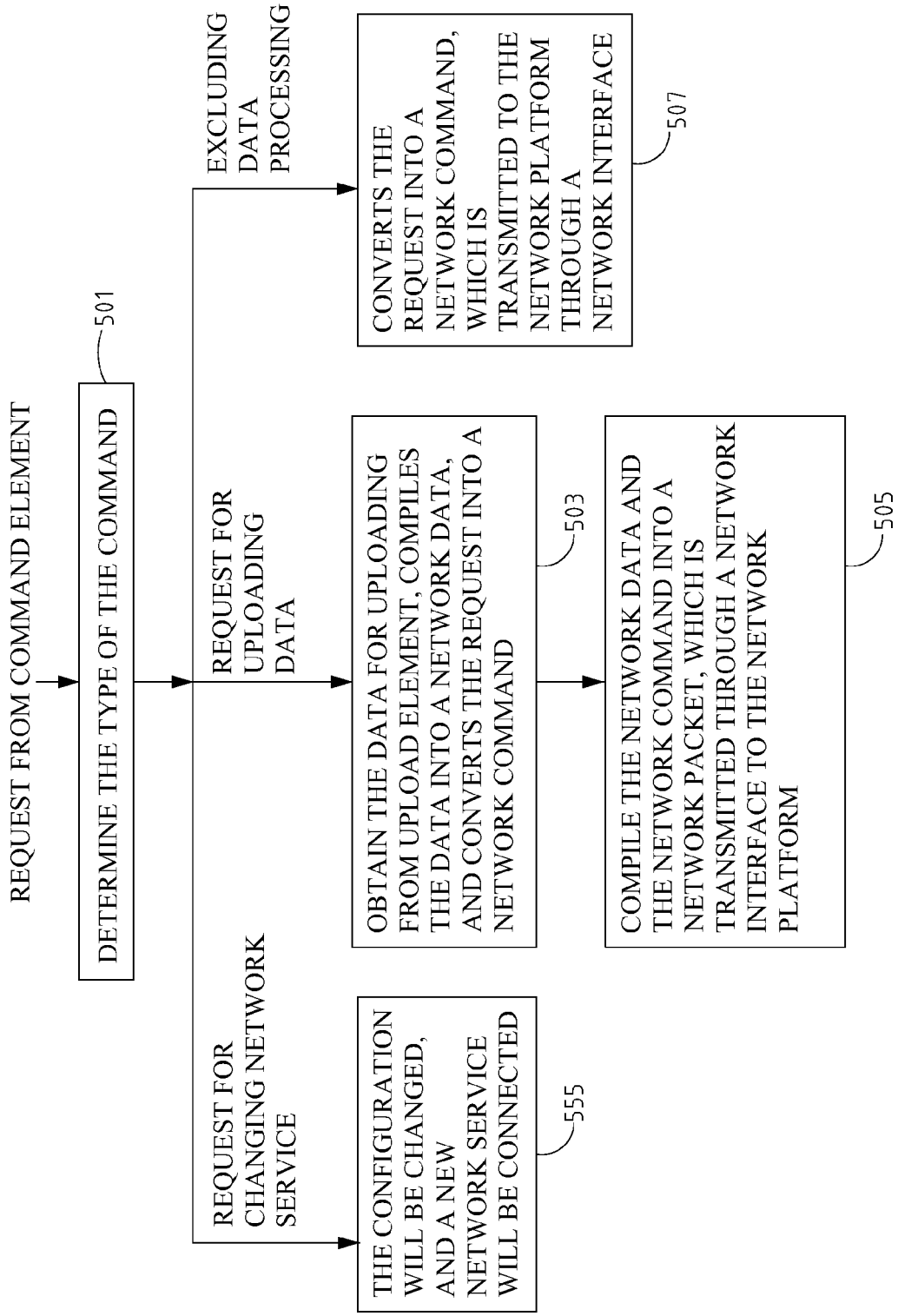
FIG. 5A shows a flowchart illustrating an exemplary data uploading, consistent with the invention.
Figure 5B:
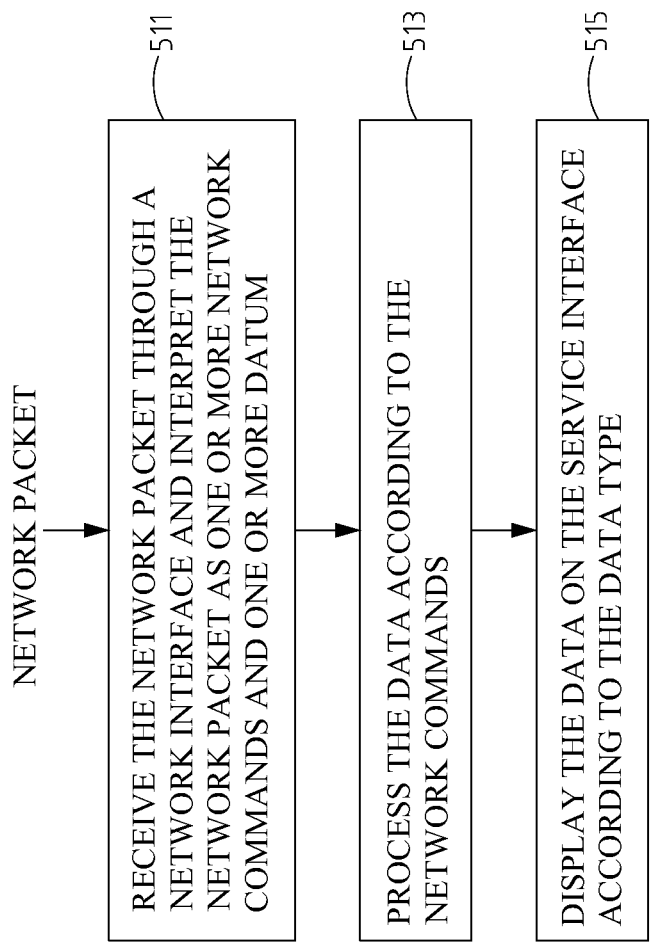
FIG. 5B shows a flowchart illustrating an exemplary data downloading, consistent with the invention.

Users may configure the service data and related configuration that the communication device can be connected to. When the user needs to use a certain service, the communication device can establish connection to the service. FIGS. 5A & 5B describe the exemplary data flow during the data exchange in uploading and downloading processes, respectively.

As shown in FIG. 5A, step 501 is for the conversion and interpretation unit to determine the type of the command from the command element during the uploading process when the uploading element issues a request. If the command type is to change the network service, the configuration will be changed, and a new network service will be connected, as shown in step 555. If the command type is to upload data, the conversion and interpretation unit will obtain the data for uploading from upload element, compiles the data into a network data, and converts the request into a network command, as shown in step 503. Step 505 is to further compile the network data and the network command into a network packet, which is transmitted through a network interface to the network platform. If the command type is not for data processing, the conversion and interpretation unit directly converts the request into a network command, which is transmitted to the network platform through a network interface, as shown in step 507.

It is worth noting that the conversion and interpretation unit will select and configure the network services at the beginning of the uploading process. The complete configuration profile at least includes the uniform resource locator (URL)/web address, upload/download element, and the tag mapping for the web page. The conversion and interpretation unit is connected to a network service and waits for the request or response. If a request is issued from the command element, the present invention executes the process of FIG. 5A.

As shown in FIG. 5B, if a network packet is transmitted from the network platform during the downloading process, the conversion and interpretation unit will receive the network packet through a network interface and interpret the network packet as one or more network commands and one or more data, as shown in step 511. Step 513 is to process the data according to the network commands. Step 515 is to display the data on the service interface according to the data type, such as playing audio, displaying the images, or texts.

Figure 6:
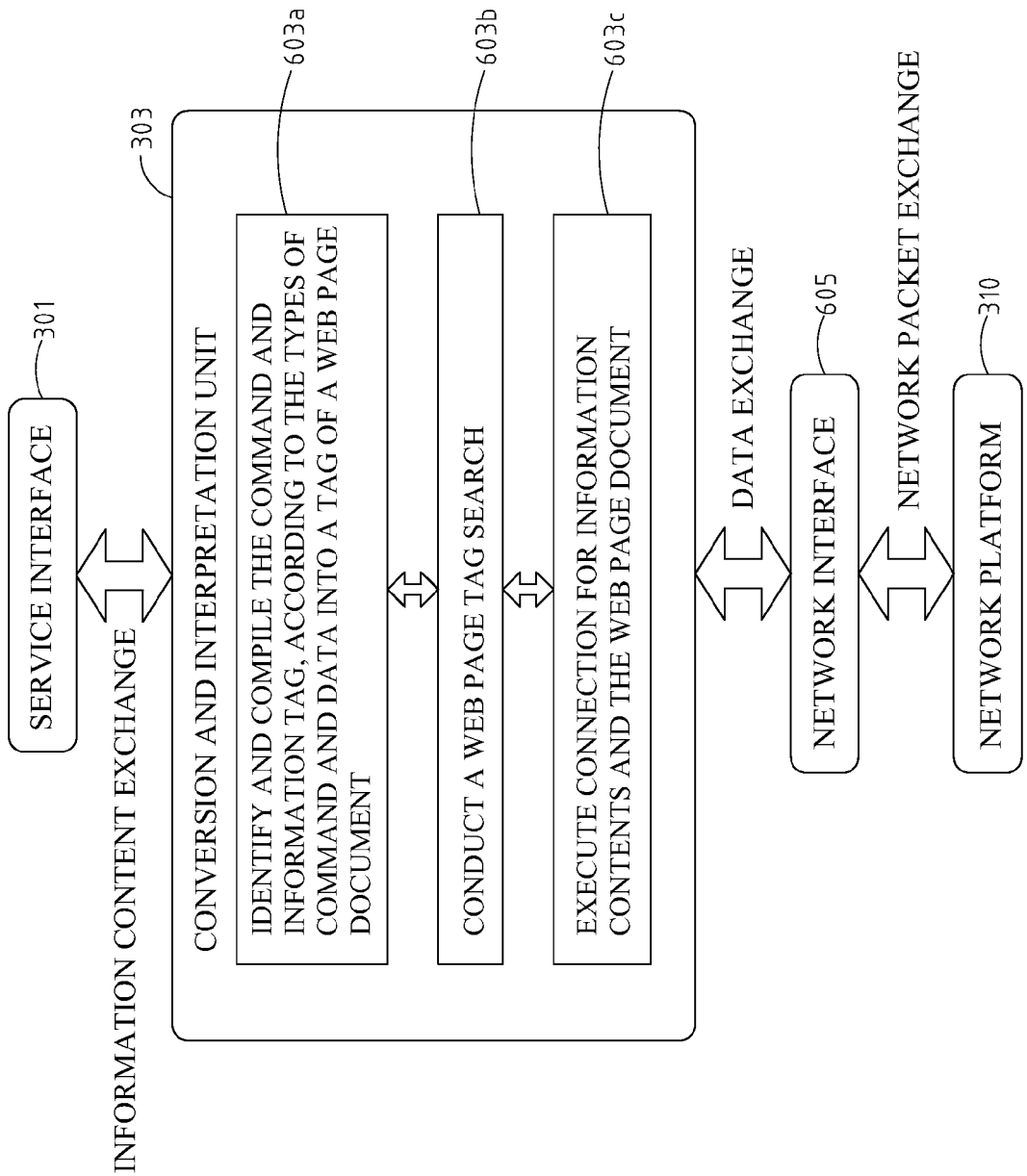
FIG. 6 shows a diagram, illustrating an exemplary operation of the conversion and interpretation unit, consistent with the invention.

FIG. 6 shows an exemplary operation of the conversion and interpretation unit consistent with the invention. As shown in FIG. 6, the conversion and interpretation unit 303 is connected to a network interface 605 and a service interface 301 respectively for communication and information content exchange between the network interface 605 and service interface 301. The operation of the conversion and interpretation unit is as the following.

Service interface 301, through upload element 301a, download element 301b and command element 301c, provides the user to access network service. When the user issues an instruction through command element 301c, the instruction is sent to the conversion and interpretation unit by information contents exchange. Conversion and interpretation unit 303 identifies and compiles the command and information tag, according to the types of command and data into a tag of a web page document, as shown in 603a, According to the service contents to be accessed, a web page tag search is conducted, shown as 603b. The web page tag search includes searching the web page to locate the corresponding fields and tags.

Conversion and interpretation unit 303 executes connection for information contents and the web page document, shown as 603c. The information contents are converted into web page data, which is transmitted by data exchange to the network interface 605, and performs packet exchange with network platform 310. When there is data from the network platform 310, the packet is converted through network interface 605 into web page data and transmitted to conversion and interpretation unit 303. Conversion and interpretation unit 303 executes web page connection, shown as 603c, and searches web page tag in the web page data, shown as 603b. The found data with web page tag is identified and converted into the information contents for the user, and displayed on the service interface 301.

Basically conversion and interpretation unit 303 may include the three modules, command and data tag identification and conversion 603a, web page tag searching 603b and connection execution 603c, for operation.

FIG. 7 shows an exemplary XML web page document to demonstrate how the conversion and interpretation unit compiles the information contents into a network packet to meet the request of the user. A web page document includes a plurality of tags. This example shows a web page document describing the contents of a compact disc (CD) through the tags, including the artist, title, songs, and price.

When the user intends to search for a CD on a web page of a network service, the user can issue the "search for CD" command with keyword "CD title" through the service interface 301 of the present invention. Conversion and interpretation unit 303 compiles the "search for CD" command and the keyword "CD title" as a web page tag, and conducts the search on the web page to find the "search" "search string" tags. The information contents and the command inputted by the user are used to fill the contents of the corresponding search tag, and form a web page content by performing connection. The web page content is further converted through the network interface into a network packet and transmitted to network platform 305. When the search result is returned from the network platform 305, the search result goes through tag identification and the contents requested by the user regarding the CD are displayed on the service interface 301, including artist, title, songs, and price.

Through the service interface, the conversion and interpretation unit and corresponding operations of the present invention, the user can directly execute browsing and use participation-types service through the communication device. The following shows two working examples of the present invention.

The first exemplary example is that the user intends to search for the travel information to the United States of America (USA) through the communication device. Through the service interface, the user inputs "USA" and "travel" as the upload element, and selects the command element for "search". The conversion and interpretation unit transmits the request to the search engine in the network platform according to the defined "text" service type, with the content (search—travel, USA). Through data type identification, the conversion and interpretation unit realizes that the command is for text search through the tags, and connects to a search engine web site, such as Google, to conduct the text search. The conversion and interpretation unit searches for the search engine field in the entire web page and inputs the keywords "USA", "travel" in the tag. The converted data is transmitted to the network platform. After the search result is returned from the network platform, the conversion and interpretation unit will display the returned contents as text on the service interface.

The second exemplary example is that the user intends to download a song when the title of the song is known. The user inputs the "song title" as the upload element to the service interface of the present invention, and selects the "music download" as the command element. According to the defined "music" service type, the conversion and interpretation unit sends the request to the music server or other users on the network platform. The content of the request is (search—song title) and (download—music file). Through data type identification, the conversion and interpretation unit realizes from the tag that this is music related information contents, and connects to the defined music web site, such as iTune web page. The conversion and interpretation unit searches for the search engine field in the web page, and inputs the "song title". The converted data is transmitted to the network platform. After the web site returns a link for downloading, the conversion and interpretation unit identifies the returned data and connects to download the song. Upon completing the downloading of the song, the conversion and interpretation unit transmits the song as the download element of the service interface and plays the song through the multimedia device of the communication device.

As discussed above, the user therefore may use a service interface to input the network information. The input network information is interpreted and the returned information from the network service is compiled through a conversion unit. The compiled returned information is passed to the service interface to be displayed to the user.

Exemplary examples of user interface consistent with the invention may be used in combination with the peripherals of communication devices, such as a microphone or a digital camera, and follows an operation process to accomplish the complicated participation-typed services by the browser of a desktop PC or notebook PC. This simplifies the access to the network services, as well as accelerates and attracts more users to participate in the participation-typed service. The binding of handheld device and the participation-typed service will enrich the contents and growth of the participation-typed service.

Although exemplary examples consistent with the invention have been described with reference to the embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A web service accessing device for simplifying service interface to access web service applicable to a network platform, comprising:
   a service interface that includes at least one command element and one download element and one upload element for providing a user access to information contents; and
   a conversion and interpretation unit including instructions stored on hardware storage, wherein the conversion and interpretation unit:
      obtains from the service interface a user-input request including an information content and a command,
      interprets the information content for the at least one command element and one download element and one upload element according to preset network service types,
      compiles the information content and the command into a web page tag according to interpreted types of the information content and the command,
      generates a web page document including the web page tag,
      transmits the web page document to said network platform for processing,
      conducts a search for the web page tag on a web page generated by the network platform,
      compiles returned one or more data from said network platform calculated based on the search, and
      transmits said compiled returned one or more data for displaying the simplified version of said information contents on said service interface.

2. The device as claimed in claim 1, wherein said information contents include at least one of text, image, multimedia, and different commands generated according to different service contents.

3. The device as claimed in claim 1, wherein the upload element to receives a user choice of at least one type of text, image, multimedia and any combination of these three types.

4. The device as claimed in claim 1, wherein said conversion and interpretation unit provides reduced information for display by said service interface.

5. The device as claimed in claim 1, further including one or more multimedia peripheral devices.

6. The device as claimed in claim 1, wherein said conversion and interpretation unit is coupled to a network interface and to said service interface for performing communication and information content exchange between said network interface and said service interface.

7. The device as claimed in claim 1, wherein said conversion and interpretation unit includes a command and data tag identification and conversion module, a web page tag search module, and a connection execution module.

8. A method for simplifying service interface to access network service, applicable to a network platform, said method comprising:
   providing a service interface on a web accessing device for a user to access information contents, said service interface having at least one command element and one download element and one upload element;
   using a conversion and interpretation unit in said web accessing device, according to a defined network service type, to obtain from the service interface a user-input request including an information content and a command;
      interpreting the information content for the at least one command element and one download element and one upload element according to preset network service types;
      compiling the information content and the command into a web page tag according to interpreted types of the information content and the command;
   generating a web page document including the web page tag using said conversion and interpretation unit;
   transmitting said web page document to said network platform for processing;
   conducting a search for the web page tag on a web page generated by the network platform using said conversion and interpretation unit;
   compiling second one or more data returned from said network platform into third one or more data calculated based on the search using said conversion and interpretation unit; and
   transmitting said third one or more data for displaying the simplified version of said information contents on said service interface.

9. The method as claimed in claim 8, wherein said method performs communication and data interpretation, data conversion and data exchange between said network platform and said service interface through said conversion and interpretation unit.

10. The method as claimed in claim 9, wherein said data exchange through said conversion and interpretation unit is divided into an upload data flow and a download data flow.

11. The method as claimed in claim 10, wherein said upload dataflow further includes the following steps:
   determining the type of a particular request;
   if said particular request is to switch network service, then changing configuration and switching network service;
   if said particular request is to upload data, then obtaining data for uploading from said upload element, and compiling into a network data according to data type of said network data, converting said request into a network command, compiling said network data and said network command into a network packet, and transmitting said network packet through a network interface to said network platform; and
   if said particular request does not include data processing, then converting said request into a network command, and transmitting said network command through said network interface to said network platform.

12. The method as claimed in claim 10, wherein if a network packet is sent from said network platform, said download dataflow further includes the steps of:
   receiving said network packet, interpreting said network packet as a network command and network data;
   processing said network data according to said network command; and
   displaying said network data on said service interface according to data type of said network data.

13. The method as claimed in claim 11, wherein said upload dataflow executes operations to select and configure network service, connect to a network service and wait for a request or a response.

14. The method as claimed in claim 13, wherein the operation to configure network service includes at least uniform resource locator or web address, upload or download element, and tag mapping for web page.

15. The method as claimed in claim 9, wherein the operation of said conversion and interpretation unit includes command and data tag identification and interpretation, web page tag search, and connection execution.

16. The method as claimed in claim 15, wherein said operation of said conversion and interpretation unit further includes:
  converting a command being issued by a user through said command element, after information content exchanged, into a tag of a web page document according to types of said command and data;
  searching for corresponding field and tag in said web page document according to information contents to be accessed by said command; and
  through said connection execution to said information content and said web page document, forming a web page content, and converting said web page content into a network packet, then transmitting said network packet to said network platform.

17. The method as claimed in claim 15, wherein said operation of said conversion and interpretation unit further includes the steps of:
  converting a packet being sent from said network platform through a network interface into a web page data and transmitting said web page data to said conversion and interpretation unit;
  conducting said web page tag search in said web page data; and
  identifying and compiling a web page tag found from said web page tag search into the information content for said user, and displaying on said service interface.

* * * * *